Feb. 9, 1960     W. WIDLANSKY     2,924,407
OVERSPEED PROTECTIVE DEVICE
Filed Dec. 6, 1954
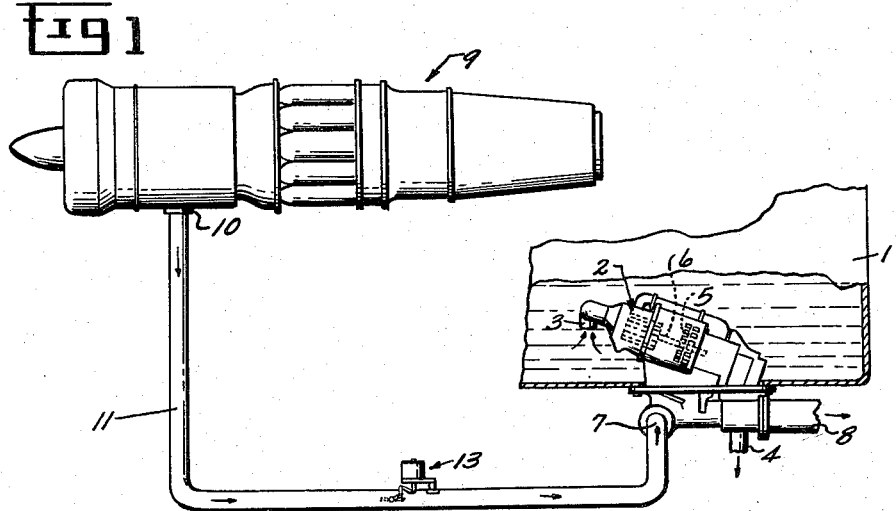
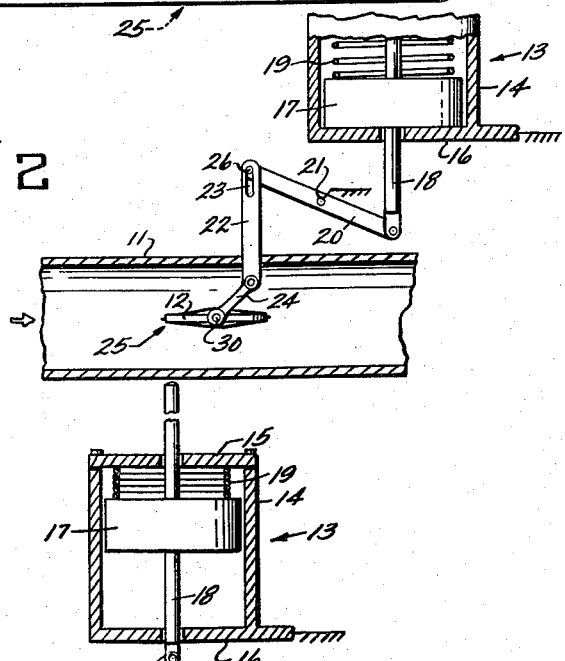
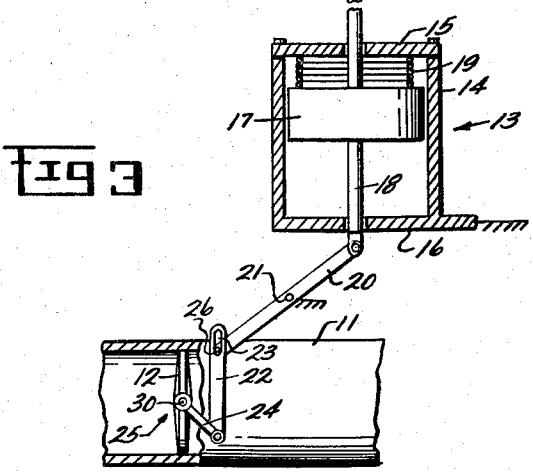
INVENTOR.
WILLIAM WIDLANSKY
BY
HIS ATTORNEY

United States Patent Office 2,924,407
Patented Feb. 9, 1960

2,924,407
OVERSPEED PROTECTIVE DEVICE

William Widlansky, Roxbury, Mass., assignor to General Electric Company, a corporation of New York Application December 6, 1954, Serial No. 473,294

5 Claims. (Cl. 244—135)

This invention relates to speed control means for a turbomachine and in particular to an overspeed control for a tank-mounted turbopump.

In jet propelled aircraft it is common practice to provide a turbine driven fuel pump mounted in the fuel storage tank to supply fuel under pressure to the engine fuel system. This type of unit may be driven by high pressure air bled from the compressor section of the jet engine. The unit is mounted in the lowest part of the fuel tank so as to keep the pump inlet under the surface of the fuel as much as possible. One of the major problems involved in the operation of a tank mounted pump of this type is the danger of the unit overspeeding when the pump inlet becomes uncovered when the aircraft experiences negative "G" conditions. Negative "G" as used herein refers to operation during which a force of acceleration acts on the aircraft and its contents in a direction opposite to the normal force of gravity experienced when the aircraft is in its normal flight attitude. Negative "G" conditions are experienced, for example, when the aircraft is in sustained inverted flight or when in the normal flight attitude, a sudden drop in altitude occurs. These conditions will cause the fuel to lift from the bottom of the tank uncovering the pump inlet. When the pump inlet becomes uncovered, the load imposed upon the drive turbine by the pump is suddenly greatly reduced. Such a reduction in load will result in a rapid increase in the speed of the turbine. Unless special precautions are taken, the speed of the unit may exceed its maximum safe speed so that an overspeed condition exists which may result in severe damage to the unit. It is therefore necessary to provide quick-acting means for preventing overspeeding of the turbopump unit when the pump inlet becomes uncovered. Accordingly, it is an object of this invention to provide an improved speed limiting arrangement which obviates the above-mentioned difficulties.

Another object of the invention is to provide an improved arrangement which will prevent a turbine driven pump unit from accelerating to an unsafe speed when the system experiences negative "G" conditions which arrangement is mechanically simple, quick-acting, and light in weight.

Briefly stated, in accordance with one aspect of the invention means are provided to interrupt the flow of motive fluid to a turbopump when the unit experiences a negative "G" condition.

The invention will be better understood from the following description taken in connection with the accompany drawing in which Fig. 1 is a diagrammatic presentation of a turbopump provided with a speed limiting arrangement in accordance with the invention; Fig. 2 is a view partly in section of a turbine inlet valve provided with a negative "G" sensing arrangement for controlling its position shown in its normal operating position and Fig. 3 is a plan view partly in section showing the apparatus of Fig. 2 in the position it assumes in response to a negative "G" condition.

Referring to Fig. 1, an aircraft engine fuel tank is indicated generally at 1 and a jet engine is indicated generally at 9. The engine 9 is provided with a compressor bleed port 10 for the purpose of bleeding compressed air from the engine compressor. Located in the bottom of the fuel tank 1 is a pump unit 2 which has an inlet 3 and which discharges to a conduit 4. A turbine 5 is mounted inside the pump unit 2. The turbine unit 5 is provided with a fluid inlet 7 and an exhaust conduit 8. A shaft 6 interconnects the turbine and pump rotors so that the former drives the latter. A fluid conduit 11 provides fluid communication between an engine bleed port 10 and the turbine inlet 7. A fluid valve generally indicated at 25 is provided in the fluid conduit 11 between the engine bleed port 10 and turbine inlet 7 to control the flow of motive fluid to the turbine 5.

The fluid valve 25 is controlled by a negative "G" sensing device 13. Referring to Figs. 2 and 3, the negative "G" sensing device 13 comprises a housing made up of a cylindrical portion 14 and top and bottom cover plates 15 and 16 which contains therein a mass 17 which is mounted on a guide rod 18 which in turn is slidably mounted for longitudinal movement within the housing. The negative "G" sensing device 13 is oriented in the aircraft so that when the aircraft is in its normal flight attitude the force of gravity will be downward along the axis of the guide rod 18. Thus when the aircraft is in its normal flight attitude, the force of gravity acting upon the mass 17 will be in the position shown in Fig. 2. In addition to the force of gravity, a spring 19 biases the mass 17 to the position shown in Fig. 2. The guide rod 18 is interconnected through a linkage arrangement including a member 20 pivoted at 21 and members 22 and 24 with a control shaft 30 upon which a valve disk 12 of valve 25 is mounted. The guide rod 18 is pivotably connected to member 20 which in turn is connected to the member 22 through a pin and slot arrangement comprising a pin 26 which is fastened to the member 20 and a slot 23 in the member 22. The member 22 is pivotably connected at one end to the member 24 which in turn is rigidly connected to the control shaft 30.

In the arrangement described, the force of gravity acting on the mass 17 in conjunction with the spring force exerted by the spring 19 forces the linkage system to the position shown in Fig. 2 with the result that the valve 25 is in its full open position under normal operating conditions. When a negative "G" condition is experienced, the acceleration force acting on the mass 17 creates an upward movement of the mass guide rod 18 against the restraining force of the spring 19. The upward movement of the mass 17 and guide rod 18 is a function of the magnitude of the negative "G" acceleration force as the restraining force of the spring 19 increases with upward movement. As the mass 17 and guide rod 18 move upward, the action of the linkage comprising the members 20, 22, and 24 is such as to move the valve disk 12 towards the closed position as shown in Fig. 3. The pin-in-slot arrangement connecting members 20 and 22 provides lost motion therebetween so that the linkage operates to start to close the valve 25 only after a desired value of negative "G" acceleration force is reached. Although a direct mechanical linkage has been shown connecting the mass 17 and the valve 25, it will be understood by those skilled in the art that, hydraulic, pneumatic, or electro-mechanical means will serve equally as well.

Referring again to Fig. 1, the operation of the overall system is as follows. Under normal flight conditions the force of gravity acts upon the fuel in the tank 1 so that the inlet 3 of the pump 2 is always under the surface of the fluid. The load imposed by the pump on the turbine 5 under these conditions is sufficient to keep the speed of the turbine 5 within reasonable limits. However, when negative "G" forces are experienced, the fuel will leave the bottom of the tank thereby uncovering the inlet 3 for the pump 2. The negative "G" sensor 13 operates in the manner described above to reduce the flow of motive fluid from the engine compressor 10 to the turbine inlet 7 by closing the valve 25 thereby preventing overspeeding.

While a particular embodiment of the invention has been described and illustrated, it will be obvious to those familiar with the art that various changes in modifications may be made without departing from the invention and it is intended to cover in the appended claims all such changes and modifications that come within the true spirit and scope of the invention.

What I claim as new and desire to secure by Letters Patent of the United States is:

1. In a fluid supply system, the combination of a fluid pumping means having fluid inlet means near the bottom of a fluid reservoir, motive means for driving said fluid pumping means, and means including a negative "G" sensing device for controlling the driving power supplied to said motive means.

2. In an airborne fluid supply having a system, a fluid reservoir, fluid pumping means having inlet suction means near the bottom of said reservoir, and motor means for driving said pumping means, controlling means for said motor means comprising an acceleration force sensing device for shutting down said motor means in response to an acceleration force tending to lift said fluid from the bottom of said reservoir.

3. In combination with a turbine driven fluid pump having a turbine rotor in driving relation with a fluid pumping element, a fluid reservoir partially filled with a fluid to be pumped, inlet means for said pump normally located beneath the surface of said fluid to be pumped, valve means for controlling the flow of motive fluid to said turbine, and means for controlling said valve means to reduce the flow of motive fluid to said turbine in response to an acceleration force opposite in direction to the normal direction of the force of gravity which would cause the pump inlet means to be uncovered.

4. Means for preventing overspeeding of a turbopump having a fluid inlet normally submerged in a body of fluid partially filling a tank, said means comprising valve means to control the flow of motive fluid to said turbopump, negative "G" sensing means comprising a mass mounted for movement in a plane coincident with the normal direction of gravity and means responsive to a movement of said mass in a direction opposite to that of the normal force of gravity to close said valve means.

5. In a fuel supply system for an aircraft, a fuel reservoir, a pump for delivering fuel from said reservoir having an inlet in said reservoir near the bottom thereof, a fluid turbine connected in driving relation to said pump, conduit means for supplying motive fluid to said fluid turbine, valve means in series flow relation with said conduit means to control the flow of motive fluid therethrough, means for sensing an acceleration force opposite in direction to the normal force of gravity, and means responsive to said sensing means for closing said valve means when aircraft experiences an acceleration force opposite in direction to the normal force of gravity.

References Cited in the file of this patent

UNITED STATES PATENTS

| | | |
|---|---|---|
| 1,558,529 | Wunsch | Oct. 27, 1925 |
| 2,382,412 | Grey et al. | Aug. 14, 1945 |
| 2,645,240 | Drake | July 14, 1953 |
| 2,704,922 | Cruckshank | Mar. 29, 1955 |
| 2,789,556 | Clark et al. | Apr. 23, 1957 |